# 3,020,588
ROTARY PLASTIC EXTRUSION DIE

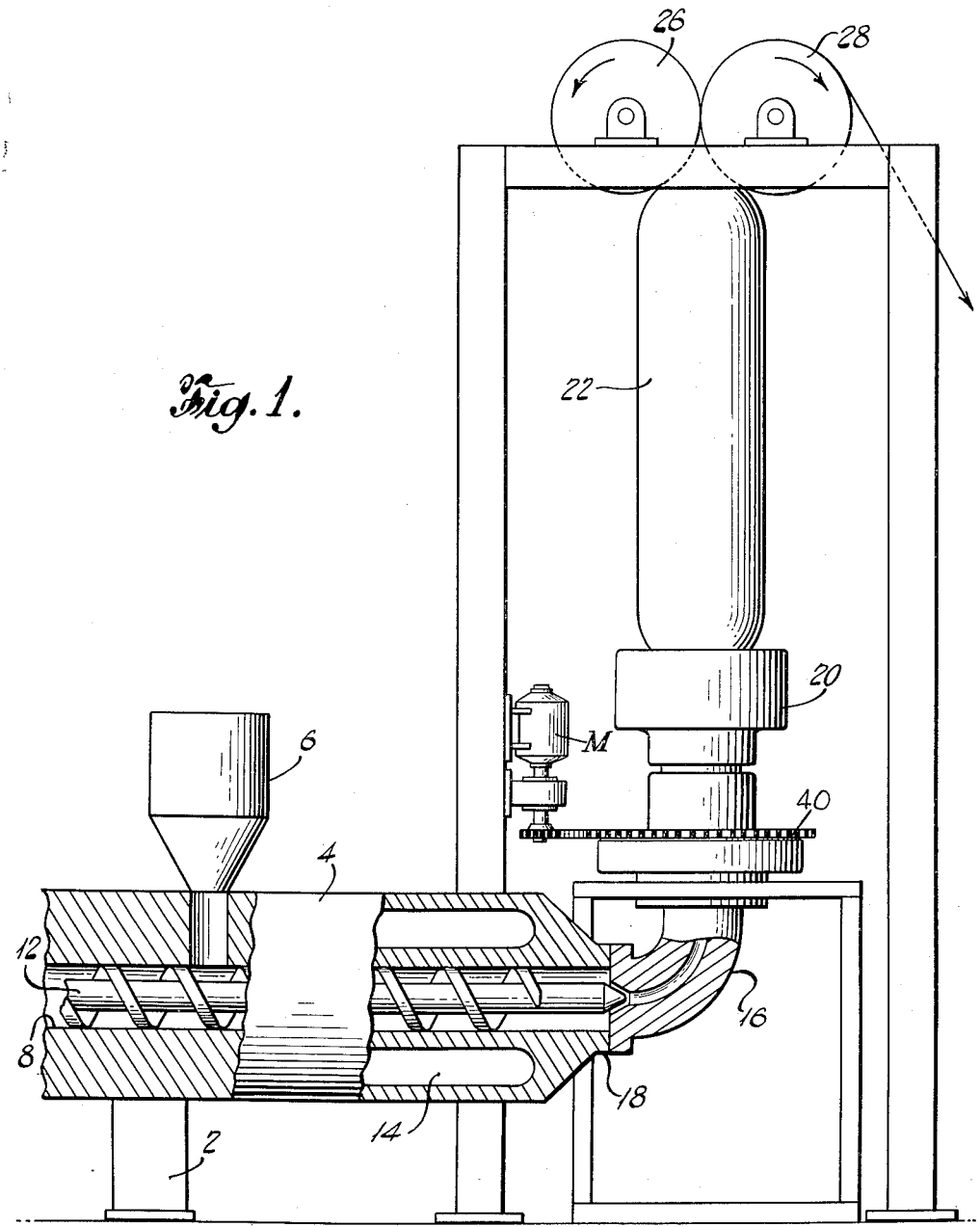

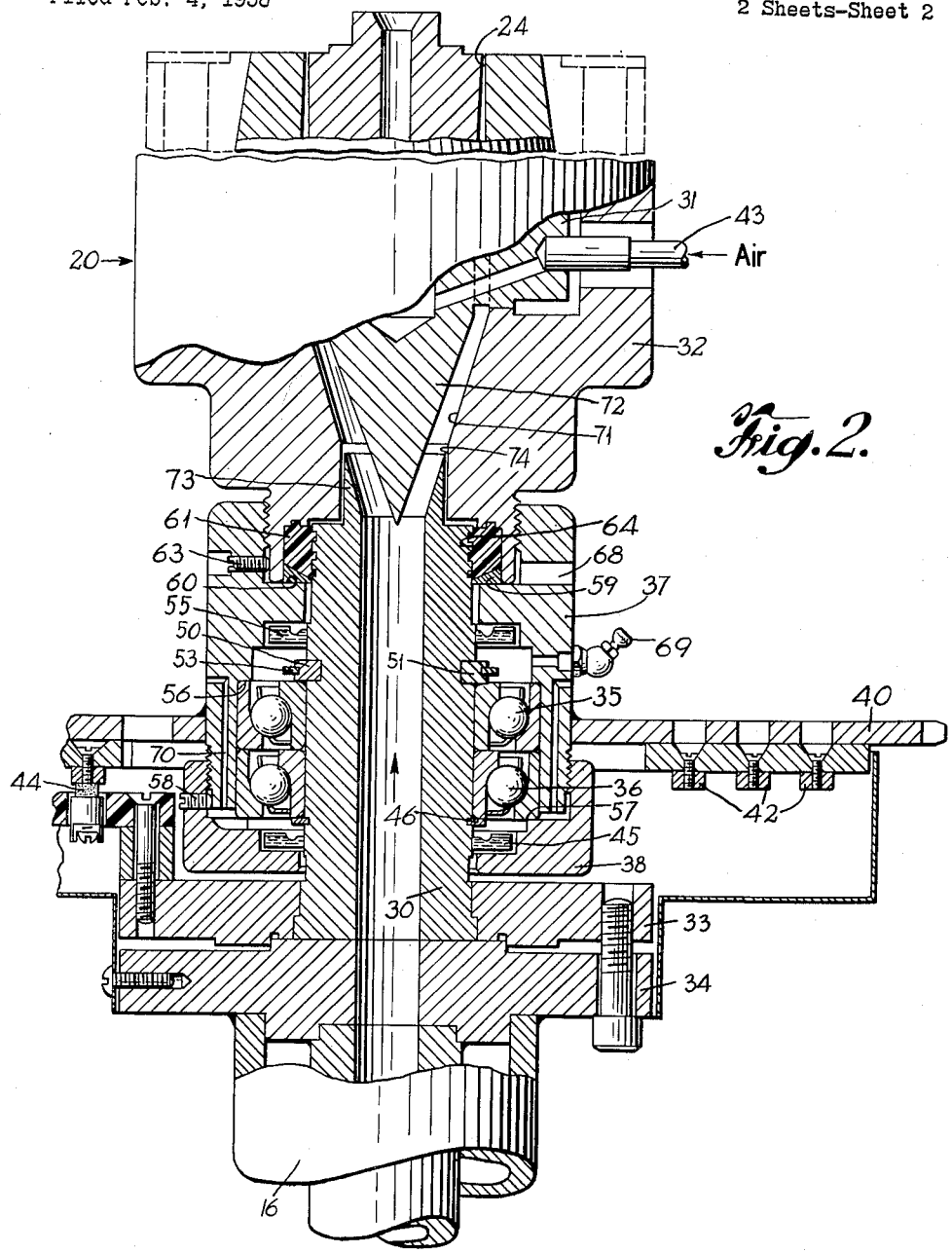

Joe S. Ferguson and Garland E. Raley, Terre Haute, Ind., assignors to Union Carbide Corporation, a corporation of New York
Filed Feb. 4, 1958, Ser. No. 713,183
10 Claims. (Cl. 18—14)

This invention relates to rotary plastic extrusion dies for the extrusion of tubing from thermoplastic materials.

U.S. Patent No. 2,461,975 discloses a tube extrusion process wherein a plastic in a molten condition is extruded through an annular die in the form of seamless tubing, and as the tubing is being withdrawn from the die and while it is in the plastic formative state, inflating the tubing to a predetermined diameter. A cooling gaseous medium is blown onto the exterior peripheral surface of the tubing to chill the tubing to an extent that when the tubing has been inflated to the predetermined diameter, it will be in a set condition.

The withdrawing of the tubing from the die is obtained by a pair of squeeze rolls which also serve to collapse the inflated tubing into the form of a two-ply ribbon, in which condition it is wound up on a wind-up reel. The inflation of the tubing is obtained by a gaseous medium introduced into the interior of the tubing. The inflating medium is entrapped or confined between the nip of the draw rolls and the die through which the molten thermoplastic is extruded.

The extrusion of such tubing from stationary dies has resulted in variations in film thickness around the periphery of the extruded tube, and variations in diameter across the face of the reeled product, with subsequent longitudinal stretching of those elements of the film preceding and in line with one or more of the resulting anticlinal folds. These conditions cause wrinkles and folds to develope at a later date when the sheet or tube is printed, fabricated, or otherwise processed and rewound.

The main object of the present invention is, therefore, to uniformly distribute any variations in thickness of the extruded tube. Another object is to provide apparatus for the continuous rotation of annular dies to distribute such variation in a helical manner around the periphery of the extruded tube, thereby improving the lay flat characteristics and appearance of the finished product. A further object is to provide continuous working of the extruded thermoplastic material between substantially coextensive inner and outer bands forming a portion of a generally diverging path from a stationary extruder nipple to an annular orifice in a rotating die, one of which bands is stationary with the extruder nipple and the other of which is rotatable with an annular die.

In the drawings:

FIG. 1 is a side elevation (with the extruder in partial section) of apparatus for carrying out the invention; and FIG. 2 is a vertical cross section through the axis of the rotary extrusion die employed in FIG. 1.

The apparatus shown in FIG. 1 comprises a support 2 for an extruder 4 having at one end a feed hopper 6 which feeds a selected thermoplastic into the screw chamber 8 thereof. In this chamber a screw 12 advances the thermoplastic through the extruder. The extruder 4 is provided with a jacketed chamber 14 through which a heating medium is circulated.

The thermoplastic material in molten condition is fed by the screw 12 through the extruder into an elbow 16 secured to the head 18 of the extruder. A die indicated generally at 20 is mounted at the outlet end of the elbow 16 and the molten thermoplastic passes thereinto. The die 20 is provided with means for inflating the tubing extruded thereby and the inflated tubing 22 is withdrawn from the die orifice in a substantially vertical direction by means of a pair of squeeze rolls 26 and 28 disposed in spaced relation to the die. These rolls also serve to collapse the tubing passing therebetween into a flattened two-ply ribbon-like material which is wound up on a wind reel.

As shown in FIG. 2, the die 20 is rotatably mounted upon a stationary flanged nipple 30 which is secured by a collar 33 bolted to the outlet flange 34 of the elbow 16 leading from the extruder 4. The die 20 consists of a die holder 32 and an adjustable core 31 spaced therefrom to provide an annular orifice 24. The cup die holder is journaled on the nipple 30 by means of upper and lower angular contact bearings 35 and 36.

These bearings are inclosed in a bearing housing 37 closed by a bearing cap 38. The die holder 32 is rotated by a sprocket 40 secured to the bearing housing 37 and chain driven from a motor M shown in FIG. 1. The sprocket 40 has collector rings 42 supplied by a brush 44 with electric power for the die heaters not shown.

The die core 31 is provided with an air inlet fitting 43 which is similar to a tire valve, to receive an air chuck on a flexible air supply hose. Since the die rotates slowly, the chuck can be applied and removed even when the core 31 is rotating.

The bearings 35 and 36 being of the angular contact type, serve to withstand the radial or horizontal load from the sprocket drive, as well as the axial thrust load of the high extrusion pressure. The bearing cap 38 contains a high temperature oil seal 45. A retaining ring 46 is installed in a groove in the nipple 30, and the bearings 35 and 36 are fitted on the nipple 30 with the lower bearing resting on the retaining ring 46.

Above the bearings 35 and 36, split ring halves 50 and 51 are held on a groove in the nipple 30 by a retaining ring 53. The bearing housing 37 contains a high temperature oil seal 55, and is threaded into the bearing cap 38 to lock the outer races of the ball bearings 35 and 36 between a shoulder 56 inside the housing 37 and a shoulder 57 inside the bearing cap 38. Set screws 58 lock the bearing cap 38 in position on the bearing housing 37. The bearings 35 and 36 are lubricated by a high temperature lubricant supplied through a fitting 69 in the bearing housing 37 until lubricant is expelled through relief hole 70.

The die holder 32 has a conical entrance bore 71 and the core 31 has a depending cone 72 spaced therefrom to form an annular passage for supplying thermoplastic material from the nipple 30 to the annular orifice 24. The nipple 30 has a conically bored cylindrical extension 73 projecting into a cylindrical extension 74 of the die holder bore and similarly receiving the cone 72. Thus the extrusion proceeds along a generally divergent path from the nipple 30 to the orifice 24. A portion of this path is confined between concentric substantially axially coextensive inner and outer bands. The outer band formed by the extension 73 is stationary with the nipple 30. The inner band formed by the axially coextensive lower end of the cone 72 rotates with the annular die 20.

During and by virtue of the continuous rotation of the annular die in the same direction relative to both the extruder 4 and the flattening rollers 26 and 28 about the bearings 35 and 36 on the nipple 30, the thermoplastic material is continuously worked between the stationary band 73 and the concentric substantially axially coextensive rotating band formed by the lower portion of the cone 72.

The outer surface of the cylindrical extension 73 and the inner surface of the cylindrical extension 74 provide reverse flow or labyrinth condition resisting leakage between the rotating holder 32 and the stationary nipple 30.

A tapered follower ring 59 is seated on a shoulder 60 of the bearing housing 37. A molded tetrafluoroethylene packing 61 passing over the nipple 30 seals on the follower ring 59. The die holder 32 is threaded into the bearing housing 37 and locked in position by set screws 63. The packing 61 compressed between the holder 32 and the follower ring 59 is forced into grooves 64 thereby forming a plastic seal between the stationary nipple 30 and the rotary die holder 32.

This device provides a tight, leak-proof rotary seal for thermoplastic extrusion processes under high temperatures (350–400° F.) and pressures (500–2000 pounds per square inch gauge). However, a failure to periodically tighten the die holder 32 against the packing 61 or to replace the packing following its normal effective life, can result in leakage past the packing seal. For this reason relief holes 68 (only one of which appears in the sections shown) are provided in the bearing housing 37 and circumferentially spaced therearound to permit escape for molten plastic should such leakage develop. Thus continuous operation of the device is possible at no risk of damage to the bearings or oil seal. Also escape of resin from the holes 68 is a visual danger signal.

This invention is particularly useful in producing seamless flattened tubing of polyethylene. It is also applicable to other thermoplastic materials such as:

Cellulose acetate
Cellulose acetate butyrate
Ethyl cellulose
Methyl methacrylate polymer
Nylon (extrusion or molding grade)
Polystyrene
Polyvinyl formal-acetate butyral
Copolymers of vinyl chloride and vinyl acetate (Vinylite)
Polyvinyl chloride (Geon)
Copolymers of vinyl chloride and vinylidene chloride (Saran)

The properties of the thermoplastic substance or composition can be modified, as by the incorporation therein of suitable modifying agents, such as plasticizers, fillers, coloring agents, heat stabilizers, antioxidants, etc.

Since it is obvious that various changes and modifications may be made in the above description without departing from the nature or spirit thereof, this invention is not restricted thereto except as set forth in the appended claims.

What is claimed is:

1. Method of producing tubing from thermoplastic materials which comprises continuously extruding said material from an extruder having a stationary nipple through an annular die journaled on said stationary nipple to form seamless tubing, said extrusion proceeding along a generally diverging path from said stationary nipple to an annular orifice in said die, a portion of said path being confined between concentric substantially axially coextensive inner and outer bands, one of which is stationary with said nipple and the other of which is rotatable with said annular die, continuously withdrawing said tubing upwardly in a vertical path from said die, flattening said tubing between rollers above said die, introducing a gaseous medium upwardly in a vertical path into the tubing to inflate it above said die and below said flattening rollers to a predetermined diameter, continuously rotating said annular die in the same direction relative to both said extruder and said flattening rollers about bearings on said stationary nipple during the extrusion step to distribute variations in thickness of the tube in unidirectional spirals around the periphery thereof and during and by virtue of said continuous rotation, continuously working said thermoplastic material between said stationary band and said concentric substantially axially coextensive rotating band.

2. A method of producing tubing from thermoplastic material which comprises extruding such material along a diverging conical path from an extruder nipple to an annular orifice in a die, the first portion of said path being confined between the smaller end of an inner rotative cone and an outer stationary conical surface, and the second portion of said path being confined between the larger rotative portion of said inner cone and a diverging rotative surface which is a conical projection of said stationary surface, and during the extrusion step working said extruded material between said outer stationary conical surface and said smaller end of said inner rotating cone by rotating said cone and said projection surface in the same direction with respect to said outer stationary surface.

3. Method of producing tubing from thermoplastic material which comprises continuously extruding said material along a diverging conical path from an extruder having a stationary nipple to an annular orifice in a die journaled on said stationary nipple to form seamless tubing, the first portion of said path being confined between the smaller end of an inner rotative cone of said die and an outer stationary conical surface of said stationary nipple, and the second portion of said path being confined between the larger rotative portion of said inner cone of said die and a diverging rotary surface of said die which is a conical projection of said stationary surface, continuously withdrawing said tubing from said die, flattening said tubing between rollers above said die, introducing a gaseous medium upwardly in a vertical path into the tubing to inflate it above said die and below said flattening rollers to a predetermined diameter, and working said extruded material between said outer stationary conical surface and said smaller end of said inner rotating cone by continuously rotating said cone and said projection surface in the same direction during the extrusion step relative to said outer stationary surface, said extruder, and said flattening rollers, about bearings on said stationary nipple.

4. Apparatus for producing tubing from thermoplastic materials which comprises an extruder having a stationary nipple, bearings on said stationary nipple, an annular die journaled on said stationary nipple, means interposed between said stationary nipple and said annular die above said bearings for preventing leakage of extruded thermoplastic therebetween, means for continuously withdrawing said tubing upwardly in a vertical path from said die, rollers above said die for flattening said tubing, means for introducing a gaseous medium upwardly in a vertical path into the tubing to inflate it above said die and below said flattening rollers to a predetermined diameter, and means for continuously rotating said annular die in the same direction relative to both said extruder and said flattening rollers about bearings on said stationary nipple during the extrusion step to distribute variations in thickness of the tube in unidirectional spirals around the periphery thereof.

5. Apparatus for producing tubing from thermoplastic material comprising an extruder having a stationary nipple with a conical stationary inner surface, a die journaled on said nipple having a rotative cone spaced inside said stationary conical surface and a diverging rotative surface spaced from said cone and forming a projection of said stationary conical surface, and means for continuously rotating said die in the same direction on its journal on said stationary nipple, to cause rotation of said projection with respect to said stationary conical surface.

6. Apparatus for producing tubing from thermoplastic materials which comprises an extruder provided with a stationary nipple and an annular die for extruding said material therethrough to form seamless tubing, squeeze rolls above said die for drawing the tubing upward from the die and collapsing the tubing into the form of a ribbon a bearing housing journaled on said nipple and secured to said die, bearings between said housing and nipple for supporting said annular die for rotation relative to said extruder about a vertical axis, a sealing ring interposed between said bearing housing and the upper end of said stationary nipple above said bearings providing a tight, leak-proof rotary seal against extrusion of thermoplastic material therebetween, and means including an annularly continuous ring member concentric with and extending completely around said die and driven by progressive rolling contact from a source of power for continuously rotating said die on said bearings to distribute variations in thickness of the extruded tube.

7. Apparatus for extruding tubing from thermoplastic materials comprising a stationary nipple connected to an extruder, an annular die holder journaled on said nipple having a cylindrical inner bore with an enlarged inlet portion and a diverging conical outlet portion, and a cone spaced inside said bore to form with said conical portion an annular orifice, said nipple having a shoulder entering said enlarged portion of the die bore, and a reduced diameter cylindrical extension projecting into said cylindrical inner bore and having a conical recess in its outer end aligned with said diverging outlet and similarly receiving said cone, and means for rotating said annular die about said conically bored extension of said nipple, said stationary shoulder entering said rotating enlarged inlet portion, said stationary reduced cylindrical portion entering said rotary cylindrical bore, said rotary cone entering said stationary conical recess and cooperating to provide reverse flow or labyrinth condition resisting leakage between said rotating holder and said stationary nipple.

8. Apparatus for extruding tubing from thermoplastic materials, comprising a stationary nipple connected to an extruder, a bearing housing journaled on said nipple, upper and lower angular contact ball bearings between said housing and nipple, a die holder secured to said bearing housing and having a bore, a core spaced inside said bore to form therewith an annular orifice, a plastic sealing ring clamped between said rotary die holder and said bearing housing and engaging the upper end of said stationary nipple above said upper angular contact ball bearings, and a sprocket rigidly secured coaxial with said bearing housing.

9. Apparatus for producing tubing from thermoplastic materials which comprises means for extruding such material along a conical path from an extruder to an annular orifice, the first portion of said path being confined by the inside frusto conical surface of a reduced cylindrical extension of a shouldered stationary nipple, the second portion of said path being confined by the inside frusto conical surface of a rotary annular die, and means for preventing leakage of plastic between the stationary and rotary portions of said path comprising a stepped cylindrical surface of relative rotation about which said annular die rotates and which in radial section forms an acute reverse angle with said conical path and comprising a central bore in said annular die and the outer surface of said stationary nipple and a larger cylindrical surface of relative rotation comprising an enlarged entrance face in said die and the shoulder of said nipple.

10. Apparatus as claimed in claim 8, in which said sprocket carries a collector ring supplied with heating current from a brush rigidly mounted with respect to said stationary nipple.

References Cited in the file of this patent

UNITED STATES PATENTS

| | | |
|---|---|---|
| 1,993,349 | Parkhurst | Mar. 5, 1935 |
| 2,192,263 | Johnson | Mar. 5, 1940 |
| 2,452,610 | Sonnenfeld | Nov. 2, 1948 |
| 2,461,975 | Fuller | Feb. 15, 1949 |
| 2,697,852 | Bailey | Dec. 28, 1954 |
| 2,937,402 | Pierce | May 24, 1960 |

FOREIGN PATENTS

| | | |
|---|---|---|
| 203,916 | Australia | Nov. 1, 1956 |
| 744,977 | Great Britain | Feb. 15, 1956 |